(No Model.)
J. A. DYBLIE.
ROPE TRANSMISSION.
No. 419,426. Patented Jan. 14, 1890.
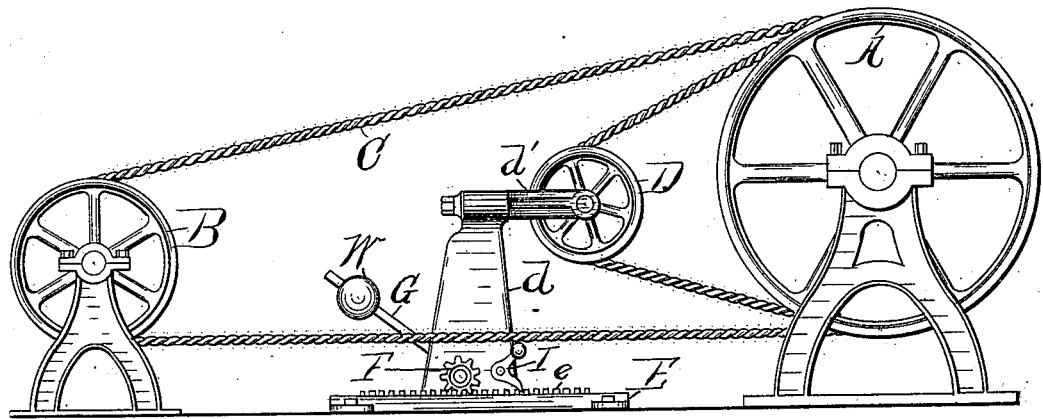
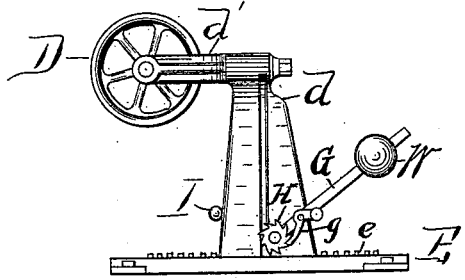
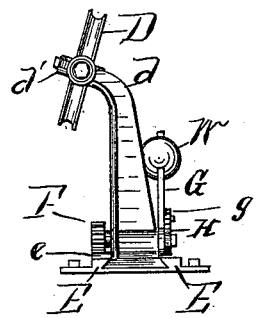
Witnesses
H. Bitner.
Frank E. Dresser,
Inventor,
Julius A. Dyblie
By his Attys
Hill & Dixon

UNITED STATES PATENT OFFICE.

JULIUS A. DYBLIE, OF CHICAGO, ILLINOIS.

ROPE-TRANSMISSION.

SPECIFICATION forming part of Letters Patent No. 419,426, dated January 14, 1890.

Application filed July 1, 1889. Serial No. 316,160. (No model.)

*To all whom it may concern:*

Be it known that I, JULIUS A. DYBLIE, a citizen of the United States of America, residing at Chicago, in the county of Cook and State of Illinois, have invented certain new and useful Improvements in Rope-Transmission, of which the following is a specification.

My invention relates to what has become known as a system of "rope-transmission." This term has been applied to any complete arrangement of proper devices designed to enable power to be transmitted from one pulley to another by means of a rope, the latter taking the place of the belt which has been heretofore more commonly used for this purpose.

In rapid motion a belt, especially a long one, always makes a great noise and clatter, and is tolerated only in the absence of any better device. This has led to numerous attempts, more or less successful, to replace belts with a rope or ropes, inasmuch as the latter, if properly arranged, run noiselessly, whether long or short, and are much cheaper than the belts. To get the requisite friction, it is customary in all of these devices to pass the rope around the two pulleys, the driving and the driven, and back and forth between them several times, thus using a rope of considerable length. The length of the rope and its great elasticity, as well as its liability to become permanently stretched or drawn out, make it necessary to provide means for taking up any slack that may occur, in order that the rope may be kept taut upon the pulleys, and it is of course desirable that, whatever means are employed, they should act automatically and not require constant attention. In the most satisfactory systems now in use a separate pulley is interposed at some point, the rope passed around it, and a spring or weight arranged to draw the pulley against the rope.

My invention is directed to the mounting of this separate pulley, which I shall call the "tightener," in the simplest and most convenient manner; and to such ends it consists in the novel means hereinafter described, and definitely pointed out in the claim hereto appended.

My improvements are illustrated in the drawings presented herewith, wherein—

Figure 1 is an elevation of a system of rope-transmission embodying my improvements; Fig. 2, a detail view of the tightener and its attachments, showing the opposite side from that seen in Fig. 1; and Fig. 3 is an end view of the same.

In the figures, A is the driving-pulley; B, the driven pulley; D, the "tightener," as I have called it. I mount the last upon a standard $d$ by means of a forked arm $d'$, in which the pulley D is journaled, and I journal the forked arm itself in the standard $d$ to allow the pulley to tip into the proper position to throw its opposite sides in line with the outer grooves of pulley A. This standard slides back and forth in guides E, and near the bottom a shaft is passed through it, bearing at one end a pinion F, meshing with a rack $e$ upon one of the guides E, and at the other end a loosely-journaled arm G and a rigidly-attached ratchet-wheel K, arranged to receive a detent or pawl $g$ upon the arm G. The last is also provided with a weight W, preferably adjustable thereon. This arrangement, it will be seen, throws the gravity of the weight W, through the arm G and pinion F, upon the rack $e$, to draw the pulley D away from the pulley A, and will act automatically to take up any slack in the rope.

To prevent the yielding of the pulley D under a heavy and sudden strain, I provide a detent I, pivoted to the opposite side of the standard from the arm G, and adapted to engage with the rack $e$ to prevent the standard from moving toward the pulley A, but free to slide over the rack to allow it to move in the opposite direction. Whenever the arm G drops down to a point where there is not sufficient room for further movement, it is raised by hand, the pawl $g$ sliding over the wheel H and engaging in a new position, the detent I engaging meanwhile with the rack $e$ to prevent the standard $d$ from being drawn toward the pulley A by the rope.

I claim as new and desire to secure by Letters Patent—

In a system of rope-transmission, the combination of the rope C, the pulleys A B, and the pulley D, arranged substantially as described, and supported by a standard $d$, sliding in guides E, and provided with the toothed wheel H, arm G, bearing-pawl $g$, and with the pinion F and pawl I, the last two engaging with a rack $e$ upon the guides E, as and for the purpose stated.

JULIUS A. DYBLIE.

Witnesses:
L. HILL,
H. BITNER.